United States Patent
Entenmann et al.

(10) Patent No.: US 8,886,414 B2
(45) Date of Patent: Nov. 11, 2014

(54) METHOD FOR DETECTING AN ACTUATING MOTION FOR AN ACTUATOR OF A MOTOR VEHICLE EQUIPMENT ELEMENT AND ACTUATOR OF A MOTOR VEHICLE EQUIPMENT ELEMENT

(75) Inventors: Volker Entenmann, Affalterbach (DE); Tingting Zhang-Xu, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/823,834

(22) PCT Filed: Mar. 13, 2012

(86) PCT No.: PCT/EP2012/001116
§ 371 (c)(1),
(2), (4) Date: Mar. 15, 2013

(87) PCT Pub. No.: WO2012/126586
PCT Pub. Date: Sep. 27, 2012

(65) Prior Publication Data
US 2014/0005895 A1    Jan. 2, 2014

(30) Foreign Application Priority Data

Mar. 23, 2011  (DE) .......................... 10 2011 014 814
Dec. 23, 2011  (DE) .......................... 10 2011 122 180

(51) Int. Cl.
*G06F 3/01*     (2006.01)
*G06F 3/044*    (2006.01)
*G06F 3/0488*   (2013.01)

(52) U.S. Cl.
CPC ............ *G06F 3/017* (2013.01); *G06F 3/044* (2013.01); *G06F 3/04883* (2013.01)
USPC ................................................. 701/49; 701/1

(58) Field of Classification Search
None
See application file for complete search history.

(56) References Cited

U.S. PATENT DOCUMENTS

| | | | |
|---|---|---|---|
| 5,802,479 A * | 9/1998 | Kithil et al. ..................... 701/45 |
| 2008/0192024 A1 | 8/2008 | Mita | |
| 2008/0240523 A1 * | 10/2008 | Benkley et al. ............... 382/126 |
| 2010/0185341 A1 * | 7/2010 | Wilson et al. .................... 701/1 |
| 2010/0328253 A1 | 12/2010 | Paulsen et al. | |

FOREIGN PATENT DOCUMENTS

GB    2 423 808 A    9/2006

OTHER PUBLICATIONS

German-language Written Opinion (PCTISA/237) dated Jul. 16, 2012 (Seven (7) pages).
International Search Report dated Jul. 16, 2012 with English translation (Six (6) pages).

* cited by examiner

*Primary Examiner* — John R Olszewski
*Assistant Examiner* — Gerrad A Foster
(74) *Attorney, Agent, or Firm* — Crowell & Moring LLP

(57) ABSTRACT

The present invention provides a method for detecting motion for the sensor controlled activation of an operating device for at least one motor vehicle equipment item having at least two capacitive sensors with overlapping detection zones, which provide signals to a control device to control the equipment item. The method comprises the determination of at least one direction of the operating motion within the overlapping detection zones as a valid motion direction for actuating the vehicle equipment item.

10 Claims, 4 Drawing Sheets

METHOD FOR DETECTING AN ACTUATING MOTION FOR AN ACTUATOR OF A MOTOR VEHICLE EQUIPMENT ELEMENT AND ACTUATOR OF A MOTOR VEHICLE EQUIPMENT ELEMENT

BACKGROUND AND SUMMARY OF THE INVENTION

Exemplary embodiments of the present invention relate to a method for detecting an operating motion for an operating device of a motor vehicle equipment item and the operating device of the motor vehicle equipment item.

The use of gesture or motion-based operating actions in a vehicle is already known. U.S. Patent Document US 2010/0185341 A1 describes a method and a device for activating a vehicle operational mode. It concerns spatial and time-based or non-time-based gesture recognition by detecting motions coupled with a comparison with a predetermined gesture. The disclosed method comprises visual monitoring of predetermined locations within or near the vehicle, detecting of a predetermined gesture within one of the predetermined spatial locations, and activating the predetermined vehicle operating mode in response to the predetermined gesture and a present vehicle operating mode. The corresponding device thus has one or more sensors to visually monitor the various spatial locations, and a control device connected thereto.

Beside such visually operating sensors, capacitive sensors for detecting gestures of proximity or touching are also known. For example, four capacitive sensors are used to operate functional units in a vehicle, the sensors being arranged in the corners or at the midpoints of the sides of a square in order to detect operating gestures. The use of four sensors, considered necessary to clearly detect a single gesture as an intended operating gesture, does, however, take significant space. Given the cramped space available in a vehicle, this may be possible only with difficulty or not at all, depending on the type of operating device.

Exemplary embodiments of the present invention are directed to a method and an operating device for detecting an operating motion that enable reliable detection of an operating motion with a reduced number of sensors.

According to a first embodiment, a method for detecting operating motion for sensor-controlled activation of an operating device for at least one motor vehicle equipment item, comprising at least two capacitive sensors having overlapping detection areas that provide signals to a control device to control the at least one equipment item, comprises the following steps: determining at least one direction of the operating motion within the overlapping detection areas as a valid motion direction for operating the motor vehicle equipment item, detecting a motion through the detection areas of two of the sensors and determining a total duration of the motion through the detection areas using the control device, detecting an overlap duration of the motion in an overlapping area of the overlapping detection areas, calculating a quotient from the overlap duration and the total duration, comparing the quotient with a predetermined threshold separating a valid area from an invalid area, wherein the threshold is determined by a ratio of a segment of distance through the overlapping area to the total distance through the detection areas aligned with the segment of distance, and determining whether the motion constitutes an operating motion with a valid direction of motion, if the quotient is in the valid area.

In the first embodiment of the method, detecting of a motion carried out by a vehicle passenger enables sensor-controlled activation of an operating device for a motor vehicle equipment item. Only two capacitive sensors arranged relative to each other to have overlapping detection areas are required to detect an activation motion.

Thus, only two sensors are required for the space-efficient detection of an operating motion, so that a simple space-efficient operating device can consist of just two sensors, if only one equipment item is to be operated and the total equipment required kept to a minimum. If the operation of more than one equipment item is intended, it is also possible to employ the method with more than two sensors, e.g. three or four, whereas one valid operating gesture for one of the equipment items can be determined between two sensors.

If a motion such as a "wiping motion" or another gesture is made, for example, by a hand, the capacitive sensors supply signals to a control device to control the equipment item. The detection method according to the invention now comprises, after at least one direction of the activation motion within the overlapping detection areas has been determined to be a "valid" motion direction intended to result in the operation of the vehicle equipment item, detecting a motion through the overlapping detection areas of at least two of the sensors and determining the total duration of the motion through the detection areas using the control device. At the same time, an overlap duration of the motion is determined in the area in which the detection area overlap. From the overlap duration and the total duration a quotient is constituted, which is compared with a predetermined threshold that separates a valid area from an invalid area. The threshold is determined by a ratio of segment of distance through the overlapping area to the total distance through the detection areas aligned with the segment of distance. From the comparison of the quotient with the predefined threshold it can be determined whether the quotient is within the valid area. If this is the case, the motion is determined as an activation or operating motion with a valid motion direction such that the operation of the motor vehicle equipment item is activated.

Thus, if more than two sensors are intended with multiple variants of valid operating gestures for various equipment items, the control device can, depending on the number of sensors, distinguish at least two valid motion directions between different pairs of sensors to activate the operating devices for at least two motor vehicle equipment items.

Thus, if it is intended that the operating device is to activate more than one equipment item, the method can be performed with more than two sensors, e.g. three or four, wherein advantageously different operating gestures for operating various equipment items can now be detected and distinguished.

Thus, with this method of evaluation, valid motions for an operating gesture can be distinguished from invalid motions by using only two sensors. This is advantageous if more than two sensor electrodes, such as the standard four sensor electrode set, cannot be used for reasons of cost or space, and also makes it possible if more than two sensors are used to distinguish between multiple valid operating gestures.

In a further aspect the valid motion direction for operating the motor vehicle equipment items is within the overlapping detection areas substantially in parallel to a line running between the center points of two sensors, i.e., along those between which a valid motion direction is defined, wherein the valid area is below the threshold. This means that, if the quotient of overlap duration to total duration is smaller than the threshold, an operating motion with valid motion direction is given. If, on the other hand, the quotient of overlap duration to total duration is larger than the threshold value, as is the case for a motion perpendicular to the valid longitudinal direction through the overlapping area, this is an invalid motion direction, and no activation of the equipment item results.

The sensor-controlled operating device according to the invention for one or more motor vehicle equipment items comprises sensors with overlapping detection areas and a control device connected to receive signals from the sensors for controlling the equipment item. The sensors of the operating device are two capacitive sensors that serve to transmit signals to the control device. The control device comprises a signal processing function, by which the method for detecting an operation motion may be effected.

In an embodiment according to the invention, the operating device may comprise four sensors, arranged in a tetragon, wherein the valid motion directions for the sensor-controlled activation of a single equipment item are respectively determined between two of the sensors.

It may be provided that one valid motion direction is determined between two sensors adjacent in the tetragon, wherein a first valid motion direction is substantially perpendicular to a second valid motion direction. It is conceivable that an equipment item might be operated with an operating gesture along the first valid motion direction, independent of which sensor pair this gesture would run along. The same would apply for the second valid motion direction. Alternatively, more than two equipment items could be activated with operating gestures along the first and second valid motion directions, if, in addition to distinguishing between a first and second motion direction and a valid and invalid motion direction, a particular sensor pair is determined for the operating of an equipment item.

In addition to the valid motion directions running between two sensors along the sides of the tetragon, at least a third valid motion direction may also be designated, defined between two sensors diagonally opposite to one another in the tetragon. To perform the method according to the invention by using the diagonally opposite sensors, the detection areas of the diagonally opposite sensors have to overlap.

To carry out the method according to the invention, the control device may comprise a data processing unit that executes the signal processing function, and in which the threshold is stored.

The operable equipment item may be a lighting device capable of being turned on and off if a valid motion is detected by the sensors, however it can be movable motor vehicle equipment items, such as a roof segment, a window, a door, or a trunk lid, which could be opened, closed, or (in the case of a seat) adjusted accordingly.

Thus, the sensor-controlled operating device could be, for example, a roof-mounted "roof operating unit", which can be made to operate an equipment item with the use of only two capacitive sensors also with gesture recognition.

If the roof operating unit comprises four sensors, various equipment items such as driver and passenger-side lights or reading lamps and an interior light can be operated by gestures. A driver-side lighting device can then be operated with a motion along the first valid operating direction between a first sensor pair, the passenger-side lighting device with a motion substantially in parallel to the first valid operating direction between a second sensor pair, while the interior lighting device can be operated with a motion along the second valid operating direction between a sensor of the first sensor pair and a sensor of the second sensor pair adjacent thereto.

Also disclosed is a motor vehicle having operable vehicle equipment items, and having for this purpose at least one sensor-controlled operating device according to the invention. If the motor vehicle has multiple operable equipment items, the operating device may have at least three sensors to differentiate at least two valid operating directions, or e.g. one sensor-controlled operating device with only two sensors may be provided for each equipment item.

These and further advantages are set forth below in the following description, with reference to the accompanying figures. The reference to the figures in the description serves to support the description and ease understanding of the subject matter of the invention. The figures represent merely a schematic representation of an embodiment of the invention.

BRIEF DESCRIPTION OF THE DRAWING FIGURES

DETAILED DESCRIPTION

With the method according to the invention, an operating motion by which an operating device for a vehicle equipment item is activated can be distinguished from an invalid motion in a detection area by capacitive sensors.

Figure 1:
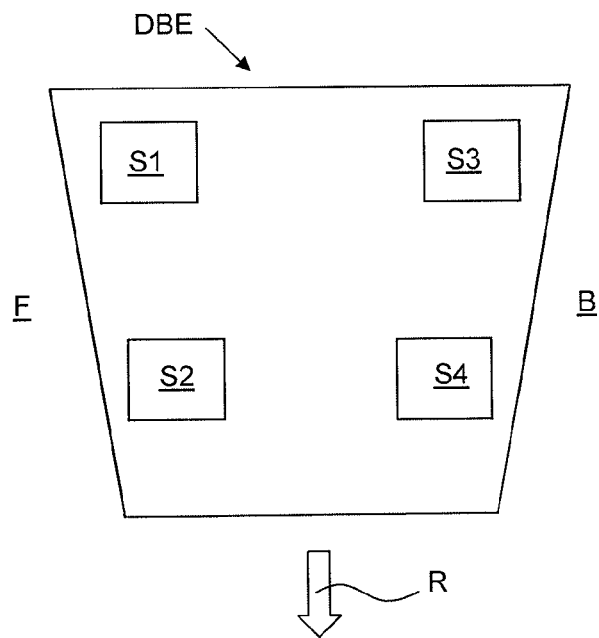
FIG. 1 is a schematic view on a roof operating element having two sensor-controlled operating devices, each with one sensor pair.

To this end, FIG. 1 depicts a roof operating unit DBE, virtually as installed in the vehicle such that block arrow R points in the direction of the windscreen. On both the driver side F and the passenger side B is located an operating device with two capacitive sensors. On the driver side F are located sensors 51 and S2, on the passenger side sensors S3 and S4 are located.

In the following figures, to explain the method, events and detection areas are depicted only for the driver-side sensors S1 and S2; however, the same applies for the operating device on the passenger side with the sensors S3 and S4.

The particular operating devices of the depicted roof operating unit DBE can be used e.g. to operate a lighting device for the driver and/or passenger. It is also conceivable that other equipment items could be operated with such a sensor-controlled operating device. This equipment item controlled by the sensor-controlled operating device could be a roof segment, such as a sunroof, which, depending on its operating state, is opened or closed if the sensors of the operating device detect an operating motion in a valid motion direction.

This could also be an automatically retractable top of a convertible, controlled by the sensor-controlled operating device. Also conceivable are the opening and closing of windows, doors, and trunk lids, as well as the adjusting of controllable seats.

The sensors S1 and S2, as well as S3 and S4, supply the value 0 to the control device if they do not detect an object in their detection area E1, E2. They supply the value 1 upon detecting an object in their detection area E1, E2.

Figure 2:
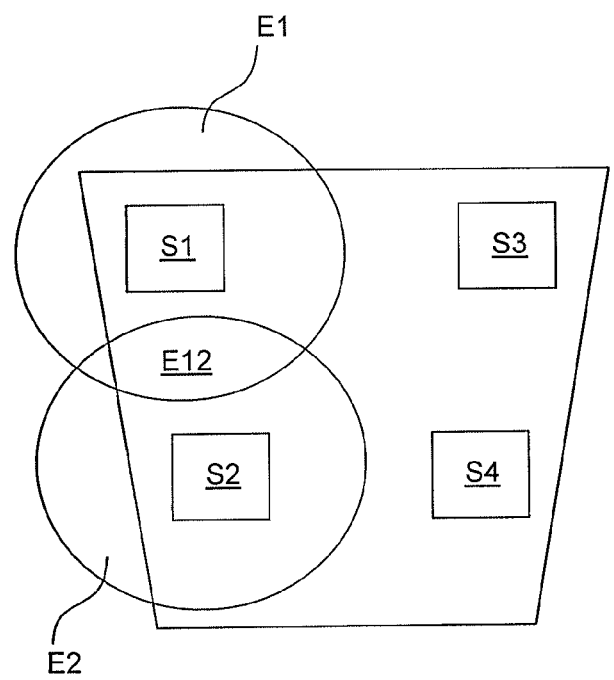
FIG. 2 is a view corresponding to that of FIG. 1, with detection areas for the first sensor pair illustrated.
Figure 3:
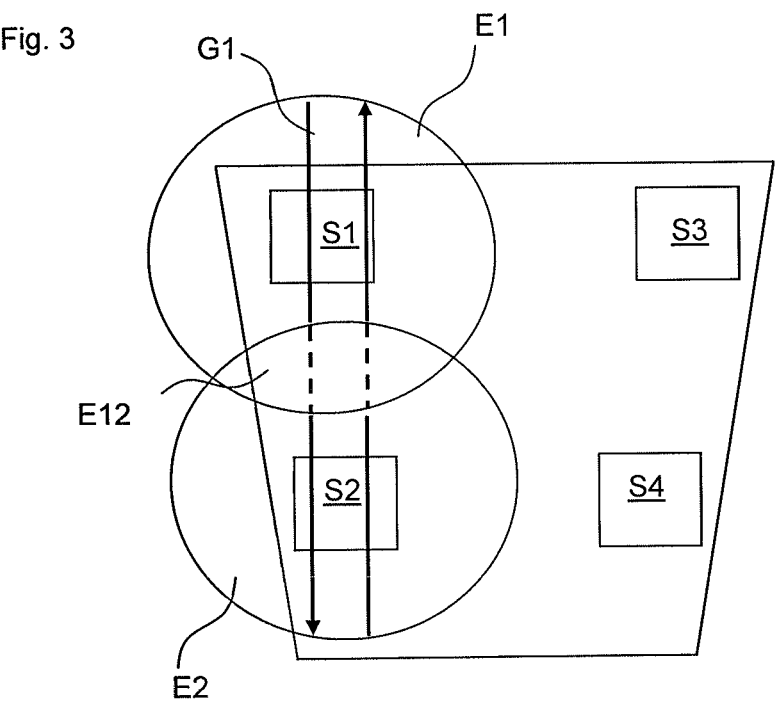
FIG. 3 is a view corresponding to that of FIG. 2, with an operating motion indicated by arrows.

The detection areas of the sensors S1 and S2 are shown in FIG. 2. The detection area E1 of sensor S1 and the detection area E2 of sensor S2 overlap in the overlapping area E12. This arrangement of the detection areas E1, E2 can be drawn on for recognizing the valid operating motion G1, as seen in FIG. 3, in that, by the control device connected to the sensors S1, S2, the time durations are determined in which only one of the two sensors is active, and how long the two sensors are active.

Figure 5:
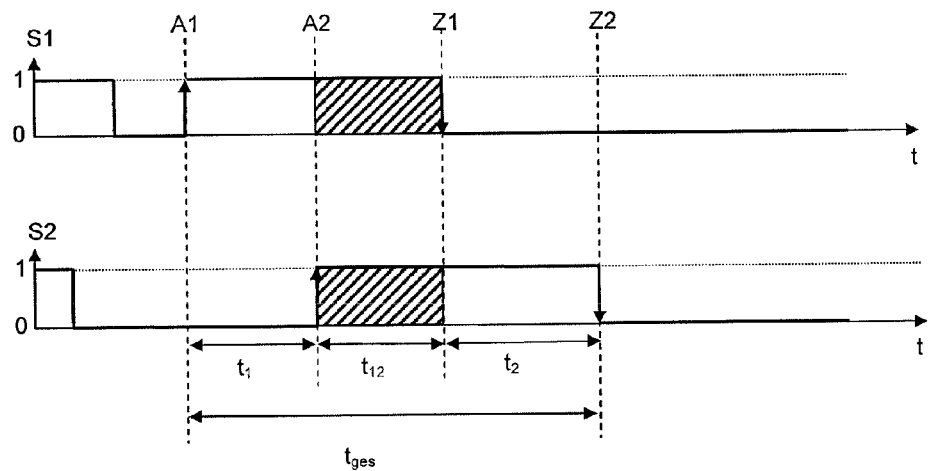
FIG. 5 is a depiction of the signals supplied by an operating device during an operating motion.

The signals transmitted to the control device by the sensors for this purpose are depicted in FIG. 5. The total duration of the gesture G1 is calculated from the rising edge from time A1 of the signal of the first sensor S1 to the falling edge at time Z2 of the second sensor S2. The overlap duration $t_{12}$, which is sketched in FIG. 3 by the dashed area of the gesture arrow G1, is calculated from the rising edge of the signal of the second sensor S2 at time A2 to the falling edge of the signal of the first sensor S1 at time Z1.

The total duration $t_{ges}$ thus comprises the time periods $t_1$ from time A1 of the rising edge of the signal of the first sensor S1 to the rising edge of the signal of the second sensor S2, in which only sensor S1 supplies a signal, the overlap duration $t_{12}$, and the time period $t_2$, in which only sensor S2 provides a signal, and which extends from time Z1 of the falling edge of the signal of the first sensor S1 to time Z2 of the falling edge of the signal of the second sensor S2.

Figure 4:
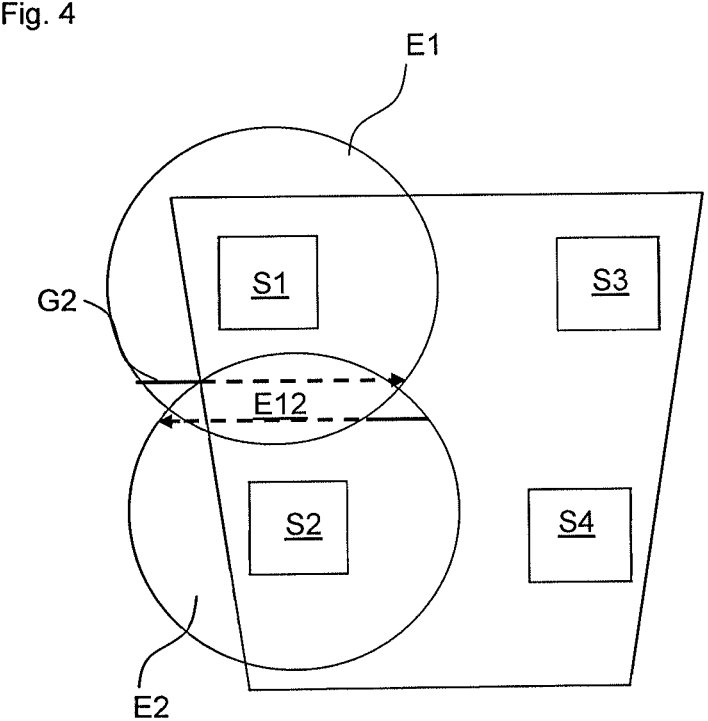
FIG. 4 is a depiction corresponding to that of FIG. 2 with an invalid motion indicated by arrows.

From the overlap durations $t_{12}$ and total durations $t_{ges}$ thus determined, a quotient can be calculated by which the permissible/valid longitudinal motions, such as gesture G1, can be differentiated from impermissible/invalid transverse motions G2, as depicted in FIG. 4, while the quotient is compared to a predetermined threshold. This threshold, which separates a valid area from an invalid area, depends on the ratio of a segment of distance through the overlapping area E12 to a total distance through both detection areas E1, E2 aligned with the segment of distance.

As can be seen in FIG. 3, the segment of distance in the overlapping area E12 of the gesture G1 is significantly shorter than the total distance taken by the gesture G1 through the detection areas E1, E2. This means that, in the case of a smoothly and evenly executed gesture, the time period spent passing through the overlapping area E12 will be significantly shorter than the total duration of the gesture G1 detected in the detection areas E1, E2.

By contrast, in the event of an invalid motion G2, as represented by the transverse motion in FIG. 4, a significant overlap duration in the overlapping area E12 is determined by the sensors S1, S2, such duration being only slightly shorter than the total duration of the gesture G2, the quotient here thus being closer to 1 than in the case of a valid gesture, for which—as shown in FIG. 3—it is significantly less than 1. The relevant threshold depends on the dimensions of the detection areas E1, E2, as well as the distance of the sensors S1 and S2 and thus the size of the overlapping area E12 in comparison with the detection areas E1, E2.

Unlike the case shown here, valid and invalid motions could also be defined inversely, i.e. an invalid motion or gesture would be in longitudinal direction while a valid gesture would be transversely, with the valid areas reversed in terms of the threshold. This means that, if the quotient of the overlap duration to total duration were determined to be larger than the threshold, the operating motion would be a valid one, while, if the quotient were smaller than the threshold, the motion would be invalid.

Also conceivable is that distinguishability of the gestures in this manner might be made use of for the operation of two different vehicle equipment items, for example in the case of the roof operating unit, one gesture motion for switching a lighting device on and off and the other gesture motion for opening a sunroof.

Figure 6:
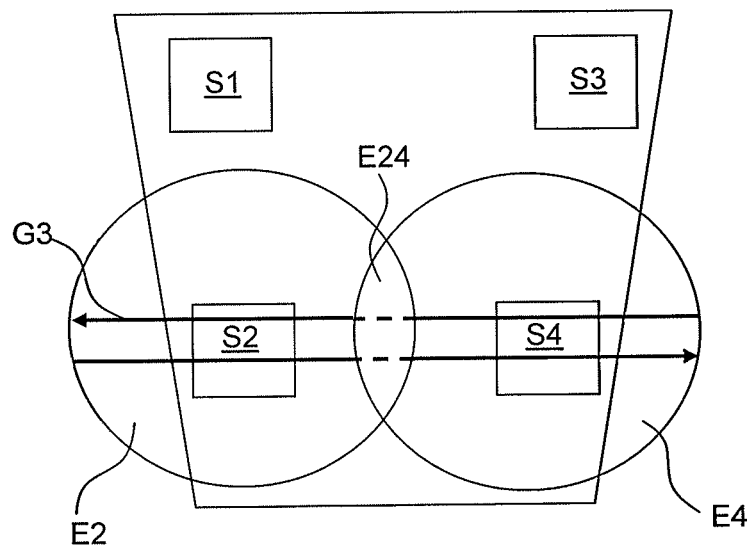
FIG. 6 is a view corresponding to that of FIG. 1 with illustrated detection zones for a pairing of a sensor of the first sensor pair and a sensor of the second sensor pair with an operating motion indicated by arrows.

A further variation for operating multiple equipment items with the roof operating unit, which comprises two operating devices with the sensor pairs S1, S2 and S3, S4, may be obtained through the definition of additional valid operating gestures between a sensor S1, S2 of the first sensor pair and a sensor S3, S4 of the second sensor pair. As shown in FIG. 6, a further valid motion direction G3 is determined between the sensor S2 and the sensor S4. Obviously, a valid motion direction can also be determined between the sensors S1 and S3 or between the diagonally opposite sensors S1 and S4 or S2 and S3 in the corresponding manner, if the detection areas E1, E2, E4 of the sensors S1, S2, S3, S4 are as large to intersect.

In FIG. 6, the detection areas E2, E4 overlap in the overlapping area E24. As described with reference to FIG. 3, the arrangement of the detection areas E2, E4 can now also be used for detecting the valid operating motion G3, while the control device, which is connected not only to the sensors S1, S2, but also to S3, S4, is used to determine the time periods in which only one of the two sensors that detect the motion is active, and how long both sensors are active.

Figure 8:
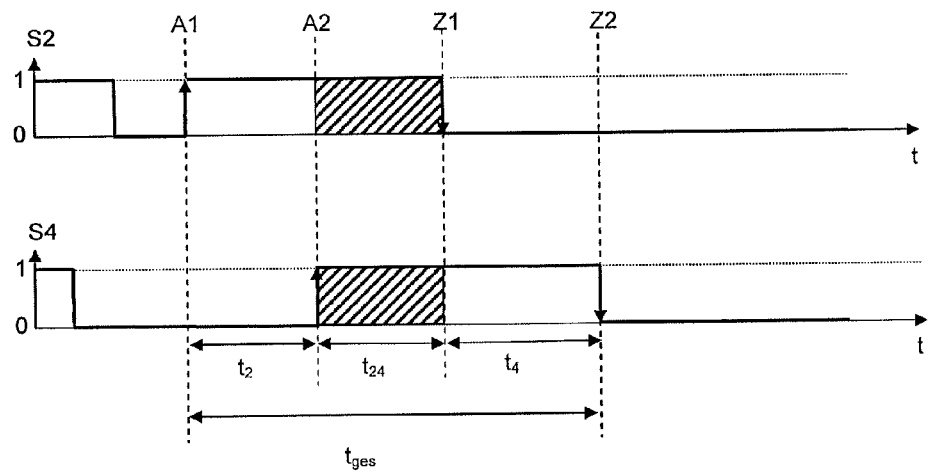
FIG. 8 is a depiction of the signals supplied by the sensor pairing of FIG. 6 during the operating motion.

The signals transmitted to this end from the sensors S2, S4 to the control device, depicted in FIG. 8, correspond to the signals of the sensors S1, S2 shown in FIG. 5. Thus, the total duration of the gesture G3 is also calculated from the rising edge from time A1 of the signal of the first sensor S2 to the falling edge at time Z2 of the second sensor S4. The overlap duration $t_{24}$, which in FIG. 5 is sketched by the dashed area in the gesture arrow G3, is calculated from the rising edge of the signal of the second sensor S4 at time A2 to the falling edge of the signal of the first sensor S2 at time Z1.

The total duration $t_{ges}$ accordingly comprises the time periods $t_2$ from time A1 of the rising edge of the signal of the first sensor S2 to the rising edge of the signal of the second sensor S4, in which only sensor S2 supplies a signal, the overlap duration $t_{24}$, as well as the time period $t_4$, in which only sensor S4 provides a signal, and which extends from time Z1 of the falling edge of the signal of the first sensor S2 to time Z2 of the falling edge of the signal of the second sensor S4.

Figure 7:
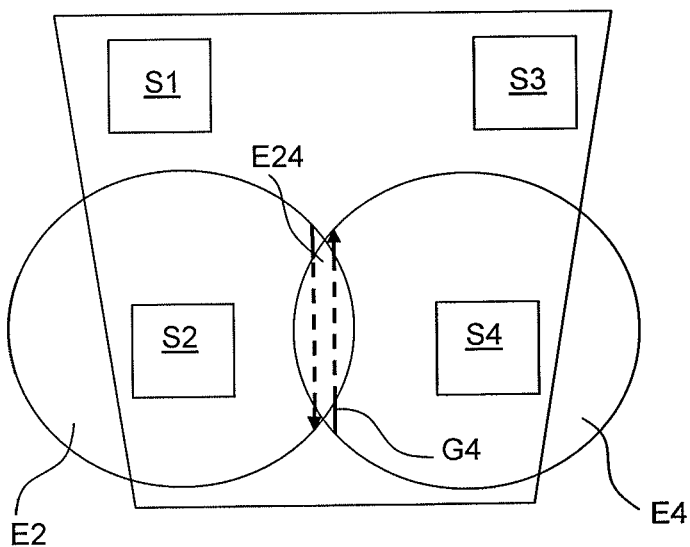
FIG. 7 is a depiction corresponding to that of FIG. 6 with an invalid motion indicated by arrows.

From the overlap durations $t_{24}$ and the total durations $t_{ges}$ thus determined the quotient can be calculated as described above by which the permissible/valid transverse motions, such as gesture G3, can be distinguished from impermissible/invalid transverse motions G4, as shown in FIG. 7, in that the quotient is compared with a predefined threshold. This threshold, which separates a valid area from an invalid area, thus depends on a ratio of one segment of distance through the overlapping area E24 to a total distance through both detection areas E2, E4 aligned with the segment of distance.

As can be seen in FIG. 6, the segment of distance in the overlapping area E24 of the gesture G3 is significantly shorter than the total distance taken by the gesture G3 through the detection areas E2, E4. This means that, in the case of a smoothly and evenly executed gesture, the time period spent passing through the overlapping area E24 will be significantly shorter than the total duration of the gesture G3 detected in the detection areas E2, E4.

By contrast, in the event of an invalid motion G4, as represented by the longitudinal motion in FIG. 7, a significantly longer overlap duration in the overlapping area E24 is determined by the sensors S2, S4, wherein such duration is only slightly shorter than the total duration of the gesture G4, such that the quotient is closer to 1 than in the case of a valid gesture, for which—as shown in FIG. 6—it is significantly less than 1. The particular threshold depends on the dimensions of the detection areas E2, E4, as well as the distance of the sensors S2 and S4 and thus the size of the overlapping area E24 in comparison to the detection areas E2, E4.

In this way, the evaluation method for detecting operating gestures is performed with various sensor pairings between the sensors S1, S2, S3, S4, in the longitudinal direction on the first and second or on the third and fourth, and in the transverse direction on the first and third or second and fourth capacitive sensor S1, S2, S3, S4. For signals of zero or one of the first and second (third and fourth) or first and third (second and fourth) capacitive sensors S1, S2, S3, S4, a overlap duration is taken into account in each case, to differentiate valid and invalid motions in the longitudinal and transverse directions of the capacitive sensors S1, S2, S3, S4. By, for example, a longitudinal motion across S1 and S2, the light or reading light on the driver side can thus be operated, and the light or reading light on the passenger side with a longitudinal motion across the sensors S3 and S4. With a transverse motion across the sensors S2 and S4 (or also S1 and S3), for example, the interior light can be operated, both on the driver side and the passenger side. Thus, both the light or reading light on the driver/passenger side as well as the interior light could be switched on and off through gestures, namely a swiping motion. Accordingly, further valid and invalid motion directions could be determined for additional sensor pairings.

The number of sensors need not be limited to four. An operating unit with only three sensors is also conceivable, which accordingly provides three sensor pairings for various operating gestures, for each of which a valid motion direction can be distinguished from an invalid motion direction. In general, if sufficient space is available, the use of more than four sensors is conceivable, with an accordingly greater number of possible sensor pairings.

Such a sensor-controlled operating device, which in its minimized form need only have two capacitive sensors, thus requires only a signal processing function by which the evaluation method for detecting an operating motion can be carried out, depending on the signals detected by the sensor pairs in question and their relation to one another.

It is conceivable that this signal processing function could be carried out merely by switching suitable electrical components; a control device can, however, also comprise a data processing unit, with which the signal processing function for implementing the method can be carried out.

Though the present invention has been described above by means of an exemplary embodiment, it is understood that various modifications and changes could be made without departing from the scope of the present invention as defined in the appended claims.

Regarding further features and advantages of the present invention, reference is explicitly made to the disclosure of the drawing.

The invention claimed is:

1. A method for detecting operating motion for sensor-controlled activation of a vehicle equipment item by an operating device comprising at least two capacitive sensors having overlapping detection areas, wherein the method comprises:
   determining, based on a direction of the operating motion within the overlapping detection areas, that the operating motion is in a valid motion direction;
   detecting a motion through detection areas of the at least two capacitive sensors;
   determining a total duration of the motion through the detection areas of the at least two capacitive sensors;
   detecting an overlap duration of the motion in an overlapping area of the overlapping detection areas;
   calculating a quotient from the overlap duration and the total duration;
   comparing the quotient with a predetermined threshold that separates a valid area from an invalid area; and
   determining that the motion is an operating motion with a valid motion direction if the quotient is in the valid area.

2. A method according to claim 1, wherein the predetermined threshold is determined by a ratio of a segment of distance through the overlapping area to a total distance length through the detection areas including the segment of distance.

3. A method according to claim 1, wherein the at least two capacitive sensors comprises three capacitive sensors, and wherein two valid motion directions between three capacitive sensors are differentiated in detecting the motion for sensor-controlled activation of two vehicle equipment items.

4. A method according to claim 1, wherein the valid motion direction within the overlapping detection areas is substantially in parallel to a line running between center points of the at least two sensors, and the valid area is below the threshold.

5. An operating device for a vehicle equipment item comprising:
   at least two capacitive sensors having overlapping detection areas; and
   a data processing unit configured to
      determine, based on a direction of the operating motion within the overlapping detection areas, that the operating motion is in a valid motion direction;
      detect a motion through detection areas of the at least two capacitive sensors;
      determine a total duration of the motion through the detection areas of the at least two capacitive sensors;
      detect an overlap duration of the motion in an overlapping area of the overlapping detection areas;
      calculate a quotient from the overlap duration and the total duration;
      compare the quotient with a predetermined threshold that separates a valid area from an invalid area; and
      determine that the motion is an operating motion with a valid motion direction if the quotient is in the valid area.

6. The operating device according to claim 5, wherein the at least two capacitive sensors comprises four capacitive sensors arranged in a tetragon, wherein valid motion directions are respectively determined between two of the four sensors.

7. The operating device according to claim 6, wherein the data processing unit is further configured to:
   determine a first valid motion direction between two capacitive sensors adjacent in the tetragon, and
   determine a second valid motion direction substantially perpendicular to the first valid motion direction.

8. The operating device according to claim 7, wherein the data processing unit is further configured to:
   determine a third valid motion direction between two capacitive sensors diagonally opposite to one another in the tetragon, if detection areas of the diagonally opposite sensors overlap.

9. The operating device according to claim 5, wherein the operating device is a roof operating unit or the equipment item comprises at least one of a lighting device, a roof segment, a window, a door, a trunk lid, and a seat.

10. The operating device according to claim 7, wherein the operating device is a roof operating unit, and the equipment item comprises:

a driver-side lighting device, which is operable with a motion along the first valid operating direction between a first sensor pair, a passenger-side lighting device, which is operable with a motion substantially in parallel to the first valid operating direction between a second sensor pair, and a lighting device, which is operable with a motion along the second valid operating direction between a sensor of the first sensor pair and a sensor of the second sensor pair adjacent thereto.

* * * * *